United States Patent
Harper et al.

(10) Patent No.: US 7,941,050 B2
(45) Date of Patent: May 10, 2011

(54) SYSTEMS AND METHODS FOR FREE SPACE OPTICAL COMMUNICATION

(75) Inventors: Warren W. Harper, Benton City, WA (US); Pamela M. Aker, Richland, WA (US); Richard M. Pratt, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 680 days.

(21) Appl. No.: 12/013,023

(22) Filed: Jan. 11, 2008

(65) Prior Publication Data

US 2009/0180781 A1 Jul. 16, 2009

(51) Int. Cl.
*H04B 10/10* (2006.01)
(52) U.S. Cl. .................................. 398/119; 398/187
(58) Field of Classification Search ............... 398/118, 398/119, 187
See application file for complete search history.

(56) References Cited

U.S. PATENT DOCUMENTS

| | | | |
|---|---|---|---|
| 6,915,076 B1 * | 7/2005 | Mittal et al. | 398/38 |
| 7,102,751 B2 * | 9/2006 | Harper | 356/437 |
| 2002/0089726 A1 * | 7/2002 | He et al. | 359/172 |
| 2004/0208645 A1 * | 10/2004 | Buckman | 398/186 |
| 2005/0099632 A1 | 5/2005 | Harper | |

FOREIGN PATENT DOCUMENTS

EP   0 582 998 A   2/1994

OTHER PUBLICATIONS

PCT International Search Report and Written Opinion.
Martini, et al., Quantum Cascade Laser-Based Free Space Optical Communications, Optical and Fiber Communications Reports, vol. 2, 2005, pp. 279-292.

* cited by examiner

*Primary Examiner* — Nathan M Curs
(74) *Attorney, Agent, or Firm* — Allan C. Tuan

(57) ABSTRACT

Free space optical communication methods and systems, according to various aspects are described. The methods and systems are characterized by transmission of data through free space with a digitized optical signal acquired using wavelength modulation, and by discrimination between bit states in the digitized optical signal using a spectroscopic absorption feature of a chemical substance.

24 Claims, 5 Drawing Sheets

SYSTEMS AND METHODS FOR FREE SPACE OPTICAL COMMUNICATION

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

In the field of communications, free-space optical communication techniques and devices are highly desirable, especially for last-mile applications, because they are wireless, are easily coupled with the existing fiber optic communication infrastructure, meet commercial data rate expectations, are rapidly reconfigurable, and are potentially more secure than RF and acoustic-based alternatives. However, performance in free space optical communications can be strongly impacted by poor transmission visibility and/or turbulence in the free space. Poor visibility, which can be a result of suspended particulates in the free space, can cause a decrease in the intensity of the received transmission. Contributing factors to poor visibility can include haze, fog, dust, and rain. Turbulence causes fast, time-dependent intensity fluctuations in the transmission and can result in the introduction of transmission errors. Accordingly, there is a need for methods and apparatus for free space optical communications with improved performance in conditions characterized by poor visibility and/or turbulence.

SUMMARY

Embodiments of the present invention include optical communications methods characterized by transmitting data through free space with a digitized optical signal using wavelength modulation, and by discriminating between bit states in the digitized optical signal using a spectroscopic absorption feature of a chemical substance. The chemical substance is typically placed within a modifier (e.g., a cell) in the light path of the wavelength-modulated, digitized optical signal. As the chemical substance is required for discriminating between bit states, the modifier is not merely a filter, but is rather a necessary component, according to the present invention, for interpreting the digitized optical signal.

Discrimination between bit states can comprise tuning a modulated wavelength of the digitized optical signal to one of at least two points on the spectroscopic absorption feature of the chemical substance. A first point occurs on the red side (i.e., longer wavelengths) of the absorption maximum and a second point occurs on the blue side (i.e., shorter wavelengths) of the absorption maximum, and each point represents a different bit state. More specifically, in one embodiment, which is a binary phase shift keying scheme, the absorption feature causes the modulated wavelength of the digitized optical signal tuned on the blue side of the absorption maximum to have an opposite phase with respect to the laser modulation than that on the red side of the absorption maximum. Other embodiments can utilize additional points for alternative phase-shift keying schemes (e.g., quadrature, etc.). A third point occurring substantially at the absorption maximum can be designated as a third state. Alternatively, the third point can be reserved for other purposes such as laser wavelength calibration. Accordingly, the bit states exist as an intensity value at different wavelengths. Therefore, a lack of digitized optical signal intensity can be interpreted as a dropped communication link.

Free space, as used herein, can refer to the medium through which the digitized optical signal travels, and can include any substantially non-waveguided medium. Examples of free space can include, but are not limited to, a volume or region of air, water, and/or space. An example of a medium that is not considered free space is a fiber optic cable. Accordingly, embodiments of the present invention can be effectively applied to communications between buildings, over or across obstacles (e.g., a public road that the sender/receiver does not own), between vehicles, between marine vessels, between aircraft, and between spacecraft or satellites. In other words, communications can occur between a variety of fixed/fixed, fixed/mobile, and mobile/mobile platforms.

In some embodiments, a normalization technique can be applied in the receiver to reduce the intensity noise caused, for example, by turbulence. Specifically, a frequency-modulated constituent signal and an amplitude-modulated constituent signal of the digitized optical signal can be separately determined, and the intensity noise in the data transmission signal can be reduced according to a functional relationship between the frequency-modulated constituent signal and the amplitude-modulated constituent signal. For example, an output signal that comprises a relative comparison between the frequency-modulated constituent signal and the amplitude-modulated constituent signal can significantly reduce the effects of turbulence compared to an "un-normalized" output signal. The relative comparison can comprise a ratio, wherein the instantaneous magnitude of the frequency-modulated signal is divided by the instantaneous magnitude of the amplitude-modulated signal.

The digitized optical signal can comprise light from a laser, for example, and can range from visible to long-wavelength infrared wavelengths. The light can comprise output from an electrically or mechanically tunable laser. In one embodiment, the light comprises output from a semiconductor laser. Exemplary semiconductor lasers include, but are not limited to, quantum cascade lasers (QCL) and tunable diode lasers.

Embodiments of the present invention can accommodate an intensity noise penalty of up to at least 35 dB in the digitized optical signal intensity. Other embodiments of the present invention can accommodate an intensity noise penalty of greater than, or equal to, 8 dB. Furthermore, effective transmissions between the source and the detector can span distances of up to at least 20 km. In certain embodiments, the effective transmission distance is at least 2 km.

Another embodiment of the present invention is an optical communications system comprising a light source to transmit through free space, a digitized optical signal acquired using wavelength modulation, and a detector to receive the digitized optical signal. A modifier exists on a light path between the source and the detector and comprises a chemical substance through which the digitized optical signal is passed. Bit states in a digitized optical signal are distinguished, at least in part, by the spectroscopic absorption feature of the chemical substance. The optical communication system further comprises a signal processing subsystem configured to process data into and out of the digitized optical signal.

The optical communications system can be configured to discriminate between bit states by tuning a modulated wavelength of the digitized optical signal to one of at least two points on the spectroscopic absorption feature of the chemical substance. A first point occurs on the red side of the absorption maximum and a second point on the blue side, wherein the first and second points represent two different bit states.

The signal processing subsystem can be configured to discriminate between bit states according to a phase shift between the digitized optical signal tuned on the red and blue sides of the spectroscopic absorption feature.

The optical communications system can be further configured to apply an intensity noise reduction technique. Accordingly, the signal processing subsystem can be configured to determine a frequency-modulated constituent signal and an amplitude-modulated constituent signal of the digitized optical signal, and to reduce the intensity noise in the data transmission signal as a function of the frequency-modulated constituent signal and the amplitude-modulated constituent signal. The function can comprise a relative comparison between the frequency-modulated constituent signal and the amplitude-modulated constituent signal. In a preferred embodiment, the relative comparison comprises a ratio between the frequency-modulated constituent signal and the amplitude-modulated constituent signal. The ratio can be embodied in an output signal that is used to discriminate the bit states.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, various embodiments of the invention, including the preferred embodiment, have been shown and described. The disclosure also describes, by way of illustration, the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments, but that the invention also includes a variety of modifications and embodiments thereto. Therefore the present description should be seen as illustrative and not limiting. While the invention is susceptible to various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

Figure 1:
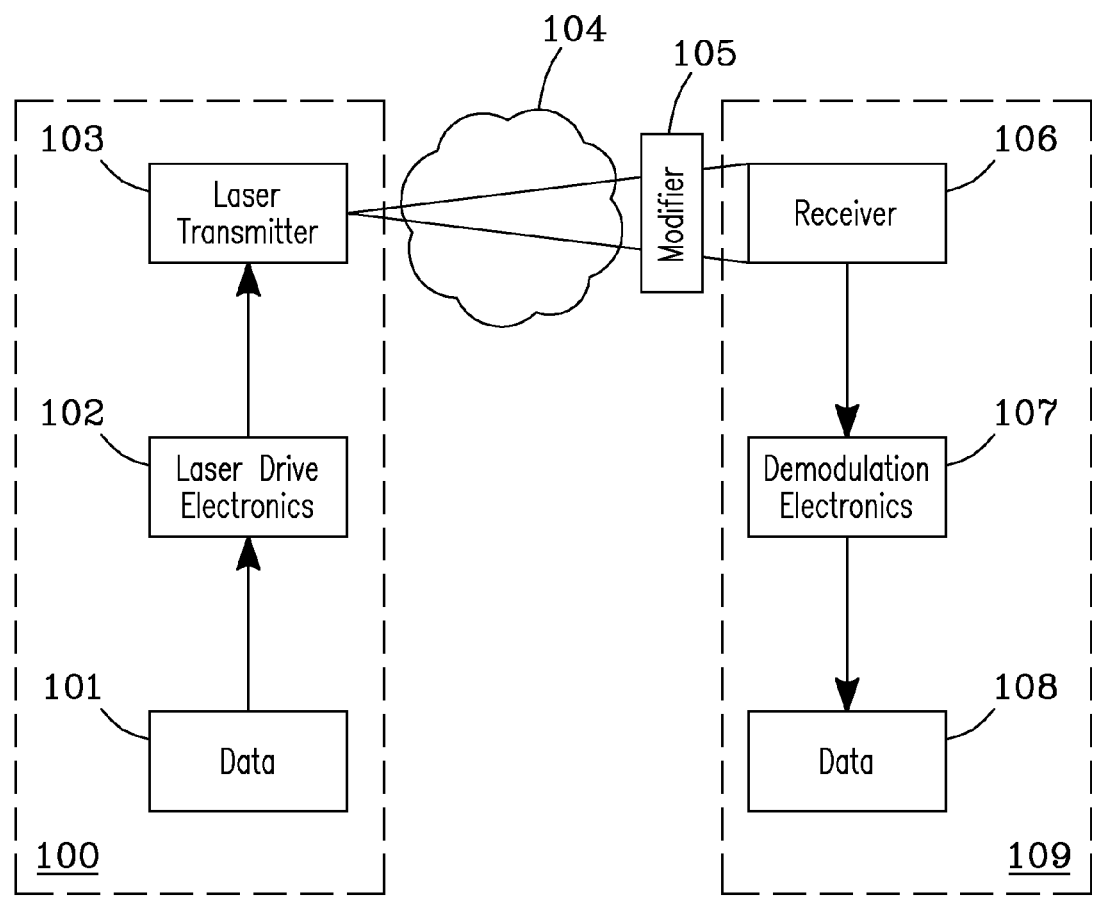
FIG. 1 is an illustration depicting a free space optical communication system according to embodiments of the present invention.
Figure 2:
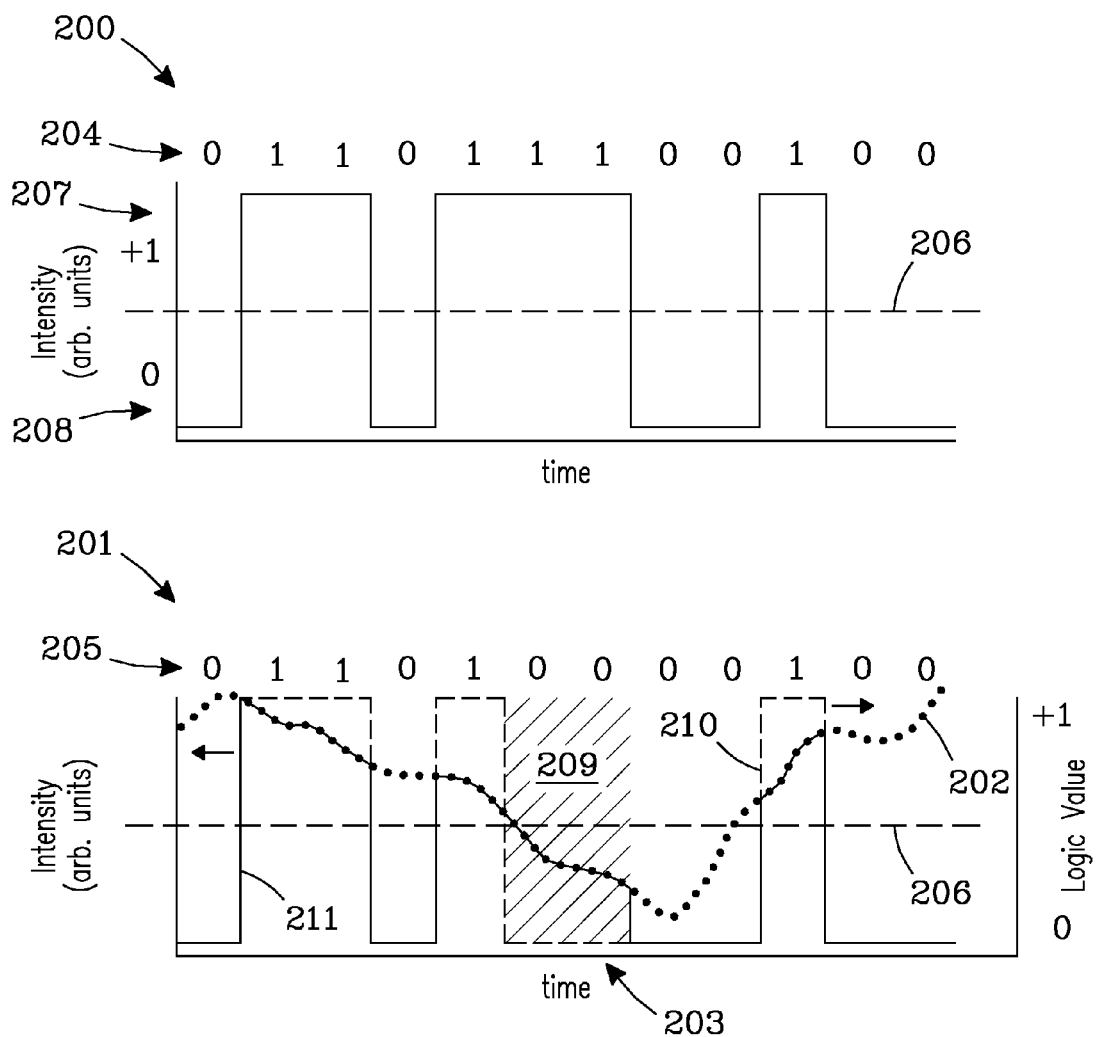
FIG. 2 shows two plots of received intensity as a function of time depicting the effects of turbulence.

FIGS. 1-5 show a variety of embodiments and/or aspects of the present invention. In some respects, aspects of the present invention can be considered to be an adaptation of wavelength-modulated (WM) spectroscopic techniques and apparatus. Referring first to FIG. 1, one embodiment of the present invention is depicted in which the flow of a data transmission proceeds through an exemplary system from a source to a detector. On the source 100, a data stream 101 is fed into the drive electronics 102 of a laser 103. The laser drive electronics 102 modulate the laser's output wavelength, thereby generating a digitized optical signal having wavelength modulation. An exemplary modulation frequency is 200 kHz, although suitable values range from above DC to the megahertz range and are primarily limited by the laser modulation properties. It should be understood that frequency and wavelength are related properties and can, therefore, be used interchangeably with greatest consideration regarding usage being given to context, convention, and clarity. The wavelength-modulated digitized optical signal propagates across free space having visibility and/or turbulence issues 104, through a modifier 105, and toward a detector 109. Once received by the receiver 106, the digitized optical signal is demodulated 107 and the data stream is recovered 108. The modifier 105 comprises a chemical substance having a spectroscopic absorption feature and is used to discriminate between bit states in the digitized optical signal. The bit states, as are detailed elsewhere herein, are determined by the received modulation phase. Accordingly, the bit states can potentially have substantially equal optical power when received at the detector 109. For example, rather than assigning one and zero bits states corresponding to intensity values above and below, respectively, a designated discriminator value, a binary transmission can comprise positive and negative phase values designated as +1 and −1 bit states, respectively.

The (+1, −1) protocol helps to reduce the number of bit errors compared to (0, 1) protocols, where errors can be caused by poor visibility and/or by turbulence. The impact that turbulence can have on free space optical communication using (0, 1) protocols can be represented by the illustrations in FIG. 2. Graph 200 shows a simple binary data transmission pattern sending a series of zero and one bits 204. The intensity values range from a lack of intensity 208 to full intensity 207. Also shown is a discriminator setting 206 at the intensity midpoint. Intensity values between the discriminator setting 206 and full intensity are interpreted as being one bits, and all intensity values between the discriminator setting 206 and zero intensity 208 are interpreted as zero bits. Turbulence in the free space between a source and a detector can impart a time-dependent attenuation, which has a completely random character, to the transmitted bit pattern. The effect of such turbulence is represented in graph 201 by a dotted line 202.

The net result of the turbulence is that the received intensity of the light (represented as a solid line 211) is modified, which can introduce bit errors. The logic value is represented as a dashed line 210. For example, the light intensity around time 203 has been sufficiently attenuated to cross below the discriminator setting 206. This results in bit errors since the intended 1 bits are incorrectly received as 0 bits 209.

Figure 3A:
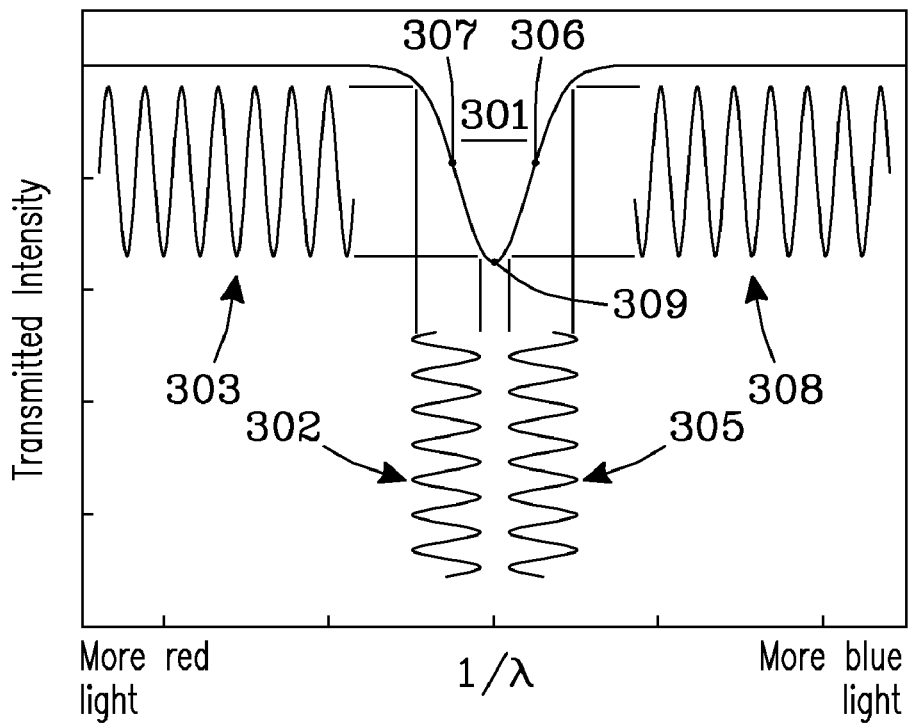
FIG. 3a is a plot of transmitted intensity as a function of time depicting the interaction between a wavelength-modulated digitized optical signal and a spectroscopic absorption peak of a chemical substance.

Embodiments of the present invention, which utilize the (+1, −1) protocol, have demonstrated more robust performance against time-dependent attenuation resulting from turbulence by transmitting data through free space with a digitized optical signal acquired using wavelength modulation, and by discriminating between bit states in the digitized optical signal using a spectroscopic absorption feature of a chemical substance. Referring to FIG. 3a, the chemical substance can have a spectroscopic absorption feature 301 that can be used to convert a digitized optical signal, which comprises wavelength modulated light 302, 305 tuned to at least two different wavelengths 307, 306, into an intensity modulated signal 303, 308. The first intensity modulated signal 303 generated by wavelength modulated light 302 and the second intensity modulated signal 308 generated by wavelength modulated light 305 will be phase shifted relative to one another.

Figure 3B:
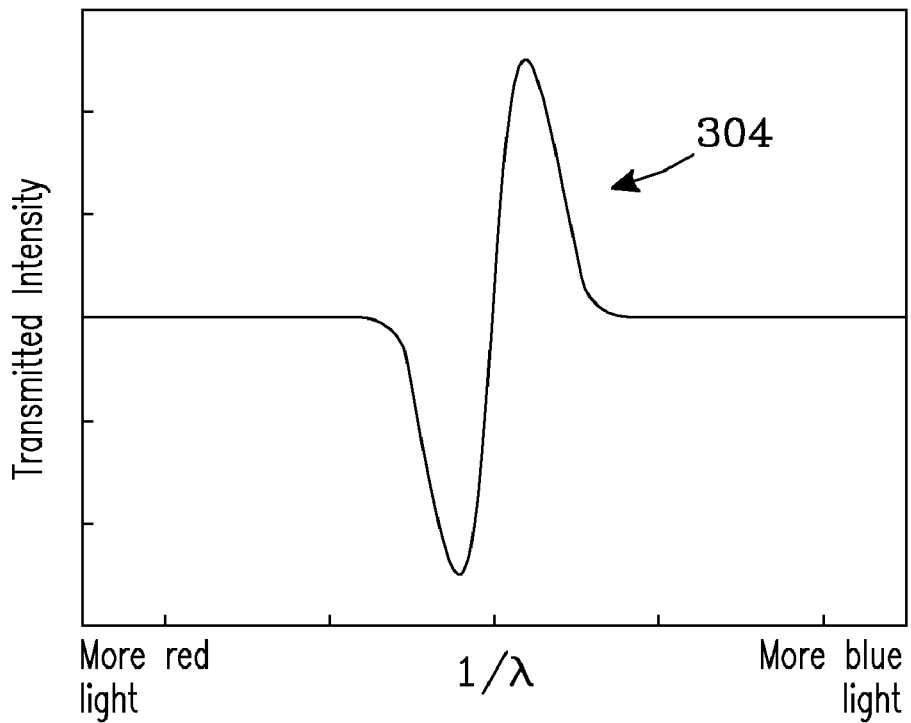
FIG. 3b is a plot of transmitted intensity as a function of time depicting the line shape of a received digitized optical signal, according to embodiments of the present invention.
Figure 4:
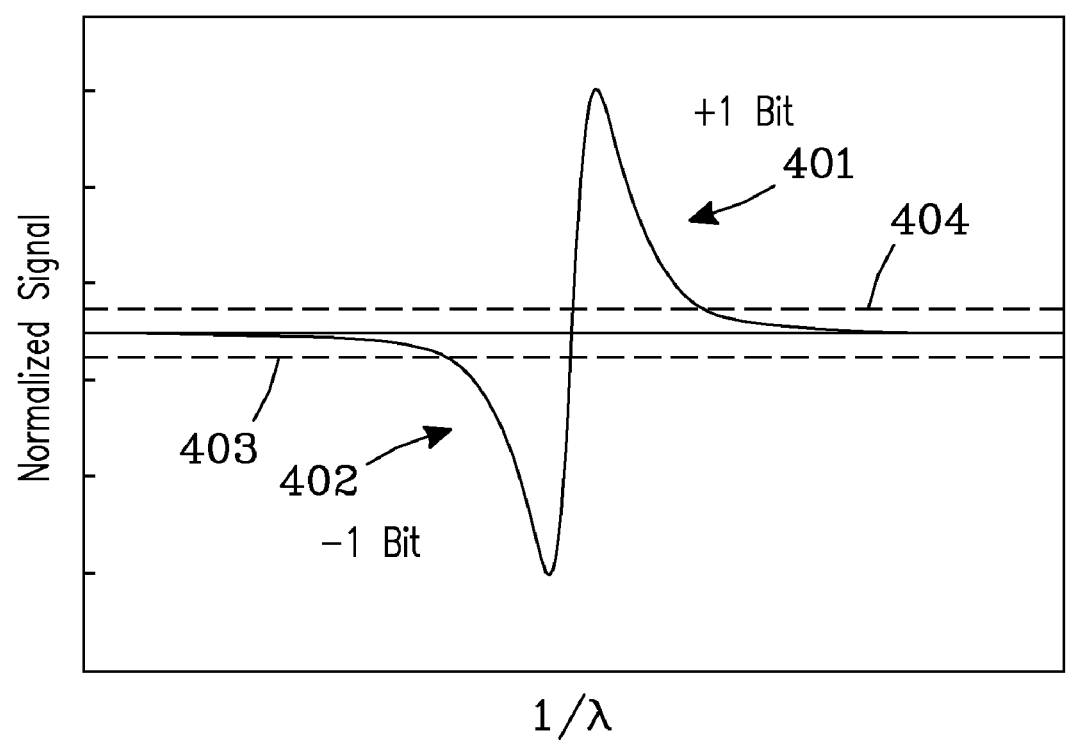
FIG. 4 is a plot of the phase of the transmitted signal intensity as a function of wavelength depicting different bit states according to embodiments of the present invention.

FIG. 3b shows an example of the transmitted signal that would be detected if the laser were tuned over a complete spectroscopic absorption feature. The line shape 304 in FIG. 3b is closely approximated by a derivative line shape. As such, the observed shape of the received signal exhibits positive and negative intensity values. Referring to FIG. 4, the positive most portions 401 can be designated as the +1 bit state and negative most portions 402 can be designated as the −1 bit state. The positive most portions 401 can be designated as those intensity values greater than an upper discriminator setting 404. Similarly, the negative most portions 402 can be designated as those intensity values less than a lower discriminator setting 403. Accordingly, in some respects, the +1 and −1 bit states are determined by the wavelength of the received optical signal. However, in the preferred embodiment, the actual discrimination between bit states is based upon phase shifts between the light tuned to different sides of the absorption feature maximum. Using the (+1, −1) scheme both bit states can be represented by a signal of potentially full intensity received at the detector. If the digitized optical signal is completely blocked or obscured, the receiver will see no signal and can determine, for example, that the link has been dropped rather than possibly assigning false zero bits. Therefore, even if turbulence or visibility issues attenuate the digitized optical signal, false bits are less likely to be transmitted to the receiver.

Referring again to FIG. 3a, in preferred embodiments of the present invention, data can be transmitted with the digitized optical signal by utilizing a wavelength modulated light signal 305, 302 at two different wavelengths 306, 307 along the spectroscopic absorption feature 301 of the chemical substance, one on the red side (e.g., longer wavelengths) of the absorption feature and the other on the blue side (e.g., shorter wavelengths). A third wavelength 309 coinciding with the apex of the absorption feature can be used as a third bit state or as an alternative signal value such as a zero point.

As mentioned elsewhere herein, discrimination between bit states is based on a phase shift between the digitized optical signal tuned at the red 303 and blue 308 sides of the spectroscopic absorption feature. In a specific example, wherein the digitized optical signal is generated by an electrically tuned laser, a current that controls the laser wavelength has three signals. The first is a DC signal that positions the laser wavelength at the absorption feature maxima. The second signal is a data modulation signal that shifts the laser wavelength from the red to blue side of the absorption feature as described earlier (i.e. shifts the wavelength from point 307 to 306). The third signal is a clock modulation signal that is synchronous with the data modulation (303, 308), but is typically at least twice the data rate. The data modulation signal shifts the laser wavelength to either the +1 or −1 bit states. The actual signal applied to the laser current is a sum of the DC, data, and clock modulation signals with the amplitudes of the data and clock modulation signals independent. The resultant transmitted signal is binary phase shift keyed (BPSK). Alternative forms of modulation can be utilized including quadrature phase shift keying (QPSK), quadrature amplitude modulation (QAM), etc.

At the detector, the received digitized optical signal may appear as a form of suppressed carrier modulation. Accordingly, the system must first recover the carrier. Various techniques are available and suited for carrier recovery in BPSK communications (see Costas, J. P. "Synchronous communications" proceedings of the IRE, Vol 47, pp 2058-2068, 1959). Using the recovered clock signal, the BPSK data signal can be mixed with the clock signal and filtered as is described generally elsewhere herein and as is shown particularly in FIG. 5.

In some embodiments, normalization techniques can be applied to reduce the noise in the received digitized optical signal. A preferred normalization technique involves a frequency-modulated constituent signal and an amplitude-modulated constituent signal of the digitized optical signal. Frequency modulation of a light source, such as a quantum cascade laser, typically results in a coincidental amount of amplitude modulation, referred to herein as residual amplitude modulation (RAM), due to non-ideal behavior of the laser and/or other elements of the system. RAM is often regarded as undesirable because of limits it can impose on the sensitivity of frequency modulation techniques. However, in the instant preferred embodiment, reduction of intensity noise in the data transmission signal is a function of the frequency-modulated constituent signal and the amplitude-modulated constituent signal (e.g., RAM), and can be based on a single light beam and detector. In another embodiment intensity noise reduction can be accomplished with a system having two or more light beams and/or detectors. The function can comprise a relative comparison between the frequency-modulated constituent signal and the amplitude-modulated constituent signal. Specifically, the relative comparison can comprise a ratio between the frequency-modulated constituent signal and the amplitude-modulated constituent signal.

In one example, a quantum cascade laser is driven with a 200 kHz frequency modulation. This frequency modulation is of a sufficiently high value that it gradually lags behind the amplitude modulation by approximately 45°. Using one of a variety of ways to separately determine the frequency-modulated and amplitude-modulated signal constituents, the intensity can be normalized by a ratio of the frequency-modulated signal constituent and the amplitude-modulated constituent signal. It should be appreciated that different functions dependent on frequency-modulated and amplitude-modulated signal constituents can be utilized to reduce noise in addition to, or as an alternative to, a ratio. By way of nonlimiting example, a relative comparison between such constituents can depend on the difference between the frequency-modulated and amplitude-modulated signal constituents. Generally, it should be understood that noise reduction according to the present invention can be broadly considered to include a function dependent, or based upon, frequency-modulated and amplitude-modulated signal constituents. Additional details regarding noise reduction are described in U.S. Pat. No. 7,102,751, which details are incorporated herein by reference.

Figure 5:
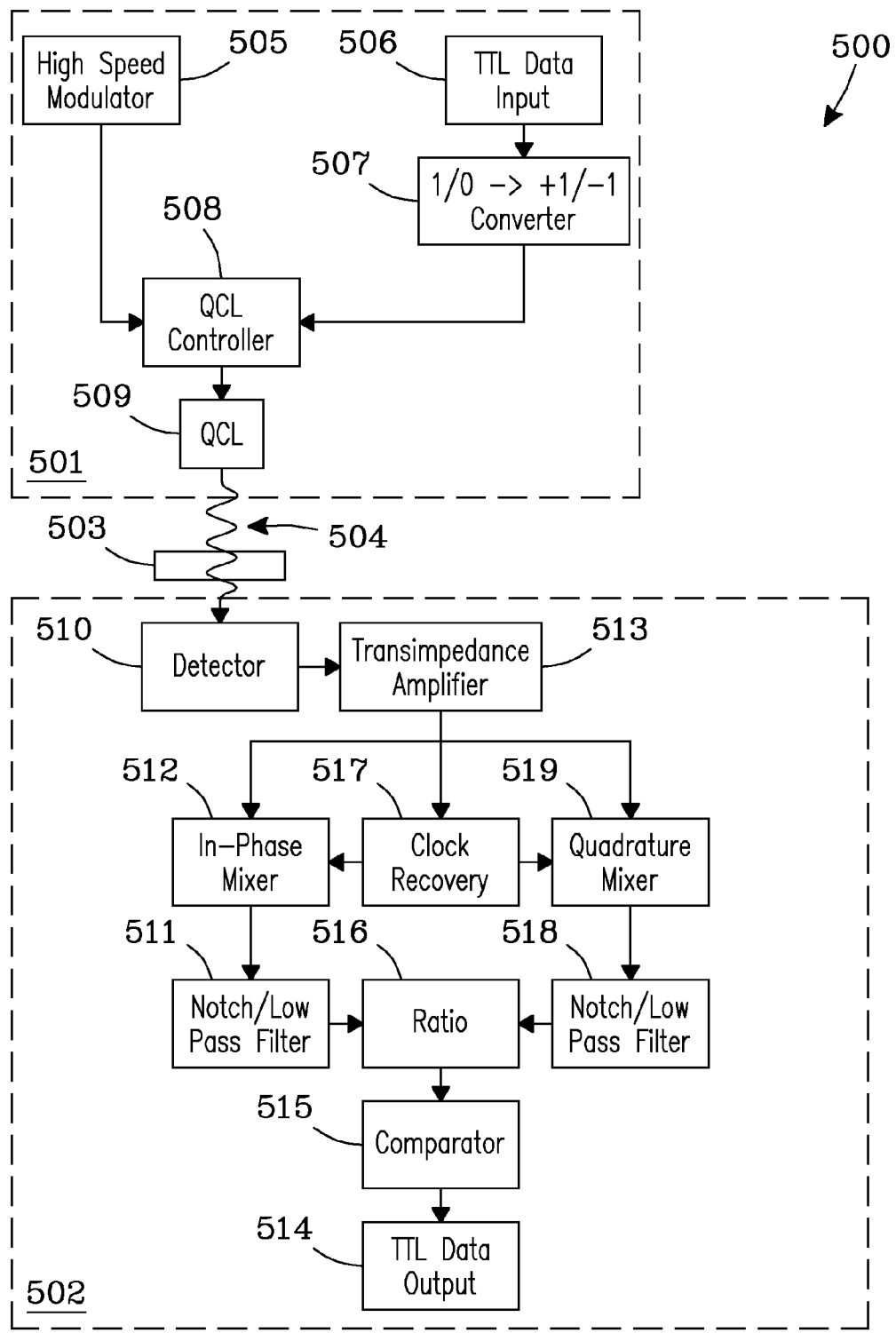
FIG. 5 is an illustration depicting a free space optical communication system according to embodiments of the present invention.

Referring to FIG. 5, a block diagram depicts an optical communications system according to embodiments of the present invention. System 500 is operable to transmit from source for 501 a digitized optical signal 504. The digitized optical signal 504 travels across free space, through a modifier 503, and towards the receiver 502. The modifier 503 comprises a chemical substance having a spectroscopic absorption feature. Exemplary chemical substances include, but are not limited to, low-pressure molecular gases, atomic gases, cooled crystals, and solid-state narrow etalon filters. While FIG. 5 depicts a preferred configuration wherein the modifier 503 is relatively proximal to the detector 510, the modifier can be placed anywhere along the optical path of the digitized optical signal 504. Placement near the detector 510 increases the inherent security of the transmission because the modifier is required to interpret the digitized optical signal. Therefore the transmission is effectively "encrypted" as it travels across free space, and is "decrypted" by the modifier 503 immediately prior to detection by the receiver 502.

The source 501 comprises a QCL 509 that can create a range of optical wavelengths. The wavelength created by the laser is a function of the current from the QCL Controller 508. The current that controls the laser wavelength is composed of three signals. The first is a DC signal that positions the laser wavelength, for example, at an absorption feature maxima. The second signal is a data modulation signal 506 that shifts the laser wavelength from the red to blue side of the absorption feature maximum (i.e. shifts the wavelength from point 307 to 306 in FIG. 3a). The third signal is a clock modulation signal 505 that is synchronous with the data modulation (e.g., 303, 308), but is typically at least twice the data rate. The data modulation signal shifts the laser wavelength to either the +1 or −1 bit states 507. The actual signal applied to the laser current is a sum of the DC, data, and clock modulation signals with the amplitudes of the data and clock modulation signals independent. The resultant transmitted signal is binary phase shift keyed (BPSK).

Modifier 503 comprises a chemical substance having a spectroscopic absorption feature. Exemplary chemical substances include, but are not limited to, low-pressure molecular gases, atomic gases, cooled crystals, and solid-state narrow etalon filters.

The receiver 502 comprises an optical detector 510 that converts optical energy into a low-level current. The transimpedance amplifier 513 amplifies this low-level current signal into a voltage signal for the in-phase 512 mixer, quadrature mixer 519 and clock recovery 517 modules. The clock recovery module 517, can use a variety of approaches including, for example, one that is similar to that developed by Costas and others and includes phase correction signals as well. A 90° phase shifted version of this the recovered clock signal is applied to the quadrature mixer 519 and a non-phase shifted version of the recovered clock signal is applied to the in-phase mixer 512. The output of the in-phase mixer is the frequency modulated (FM) signal and the output of the quadrature mixer is the amplitude modulated (AM) signal. Both of these signals are filtered by notch/low-pass filters 511 and 518 and applied to the ratio module 516. For analog implementations, the ratio circuit can be an AD734 (Analog Devices) where the FM signal is connected to the multiplier input and the AM signal is applied to the division inputs. The output of the ratio module is corrected for the effects of turbulence and applied to the comparator 515. This module splits the ratio signal into two parts, one part is low pass filtered to remove the data signals and leave the remaining uncorrected turbulence signals and the second part contains both the remaining turbulence and data signals. The comparator converts these signals to TTL 514.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An optical communications method characterized by transmitting data through free space with a digitized optical signal acquired using wavelength modulation, and by discriminating between bit states in the digitized optical signal using a spectroscopic absorption feature of a chemical substance, said discriminating comprising tuning a modulated wavelength of the digitized optical signal to one of at least two points on the spectroscopic absorption feature of the chemical substance, a first point occurring the red side of the absorption maximum and a second point occurring on the blue side, wherein the first and second points represent two different bit states.

2. The method of claim 1, further comprising designating a third point occurring substantially at the absorption maximum as a third state.

3. The method of claim 1, wherein the chemical substance is placed in a light path between a source and a detector of the digitized optical signal, and discrimination of bit states is based on a phase shift between the digitized optical signal tuned at the red and blue sides of the spectroscopic absorption feature.

4. The method of claim 3, wherein the chemical substance is proximal to the detector.

5. The method of claim 1, further comprising designating a lack of digitized optical signal intensity as a dropped communication link.

6. The method of claim 1, further comprising determining a frequency-modulated constituent signal and an amplitude-modulated constituent signal of the digitized optical signal, each having a degree of intensity noise, and reducing the intensity noise in the data transmission signal as a function of the frequency-modulated constituent signal and the amplitude-modulated constituent signal.

7. The method of claim 6, wherein the function comprises a relative comparison between the frequency-modulated constituent signal and the amplitude-modulated constituent signal.

8. The method of claim 7, wherein the relative comparison comprises a ratio between the frequency-modulated constituent signal and the amplitude-modulated constituent signal.

9. The method of claim 7, further comprising generating a ratio output signal as a representation of the relative comparison for use in detecting the bit states.

10. The method of claim 1, wherein the digitized optical signal ranges from visible to long-wavelength infrared light.

11. The method of claim 1, wherein the digitized optical signal comprises output from an electrically or mechanically tunable laser.

12. The method of claim 11, wherein the laser is a semiconductor laser.

13. The method of claim 1, wherein the digitized optical signal, between points of transmission and receiving, travels through free space characterized by a degree of turbulence.

14. The method of claim 1, accommodating an intensity noise penalty of at least 8 dB in the digitized optical signal.

15. The method of claim 1, accommodating an intensity noise penalty up to at least 35 dB in the digitized optical signal.

16. The method of claim 1, wherein the transmitting occurs between a source and a detector spanning a distance of at least 2 km.

17. The method of claim 1, wherein the transmitting occurs between a source and a detector spanning a distance up to at least 20 km.

18. An optical communication system comprising:
a light source to transmit through free space a digitized optical signal acquired using wavelength modulation;
a detector to receive the digitized optical signal;
a modifier between the source and detector comprising a chemical substance through which the digitized optical signal is passed, wherein bit states in the digitized optical signal are discriminated by tuning a modulated wavelength of the digitized optical signal to one of at least two points on a spectroscopic absorption feature of the chemical substance, a first point occurring on the red side of the absorption maximum and a second point occurring on the blue side of the absorption maximum, the first and second points representing two different bit states; and
a signal processing subsystem to process data into and out of the digitized optical signal.

19. The optical communication system of claim 18, wherein the signal processing subsystem is configured to discriminate between bit states according to a phase shift between the digitized optical signal tuned on the red and blue sides of the spectroscopic absorption feature.

20. The optical communication system of claim 18, wherein the signal processing subsystem is configured to determine a frequency-modulated constituent signal and an amplitude-modulated constituent signal of the digitized optical signal, each having a degree of intensity noise, and to reduce the intensity noise in the data transmission signal as a function of the frequency-modulated constituent signal and the amplitude-modulated constituent signal.

21. The optical communication system of claim 20, wherein the function comprises a relative comparison between the frequency-modulated constituent signal and the amplitude-modulated constituent signal.

22. The optical communication system of claim 21, wherein the relative comparison comprises a ratio between the frequency-modulated constituent signal and the amplitude-modulated constituent signal.

23. The optical communication system of claim 21, wherein a ratio output signal represents the relative comparison and is used in detecting the bit states.

24. The optical communication system of claim 18, wherein the digitized optical signal, between the light source and the detector, travels through free space characterized by a degree of turbulence.

* * * * *